March 20, 1956     S. J. BECKER     2,738,864
CLUTCH BELLEVILLE SPRING TYPE
Filed Aug. 18, 1951
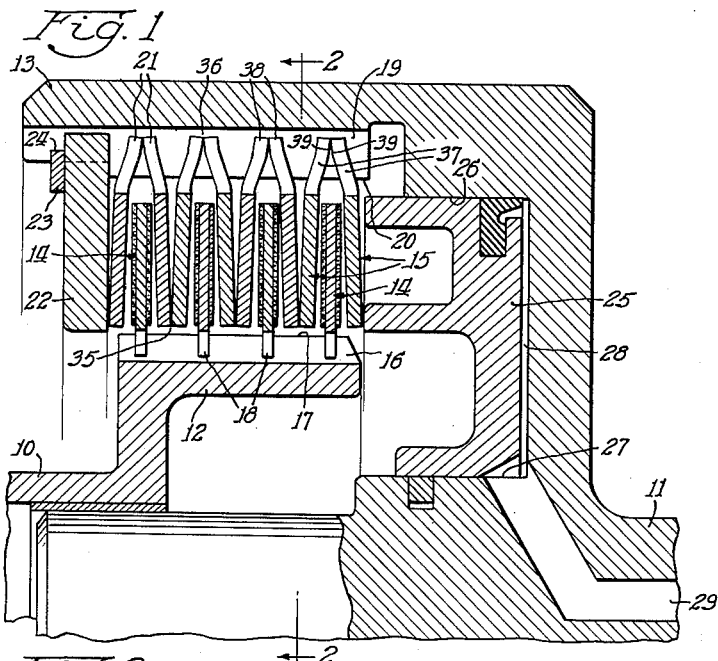
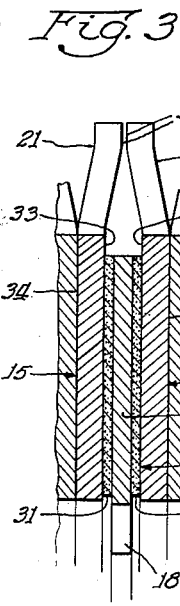
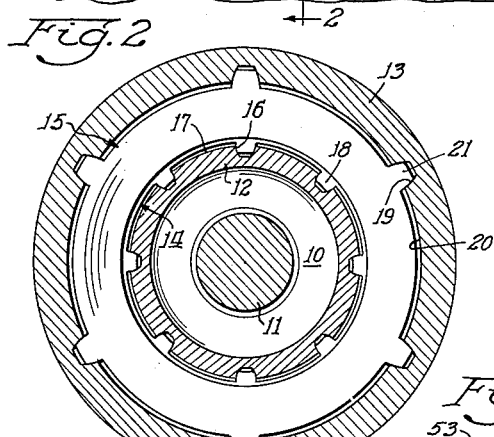
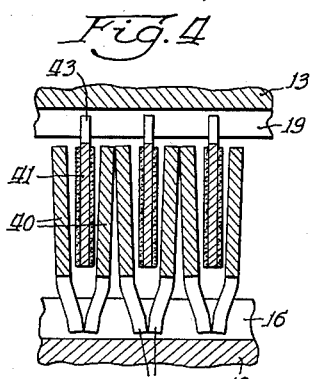
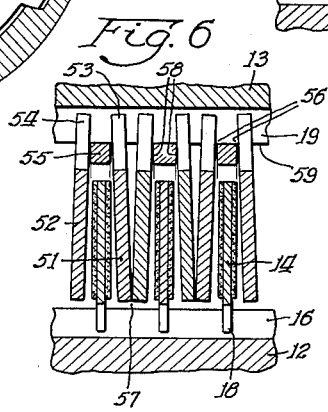
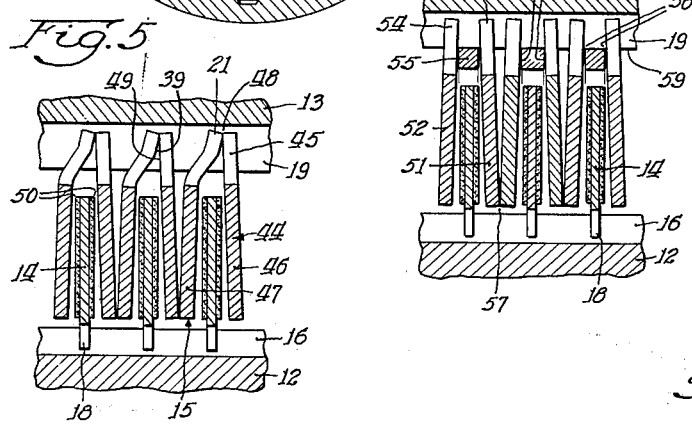
Inventor:
Sylvan J. Becker
By: H. J. Schmid Atty.

United States Patent Office 2,738,864
Patented Mar. 20, 1956

2,738,864

CLUTCH BELLEVILLE SPRING TYPE

Sylvan J. Becker, Lombard, Ill., assignor to Borg-Warner Corporation, Chicago, Ill., a corporation of Illinois Application August 18, 1951, Serial No. 242,475

17 Claims. (Cl. 192—69)

This invention relates to friction-engaging devices and more particularly to such devices of the multiple friction disc type.

An object of the invention is to provide improved friction-engaging devices of the multiple disc type.

Another object of the invention is to provide improved friction-engaging devices of the type described having two sets of friction discs, respectively connected to relatively rotatable members, the discs of one set being formed and arranged to automatically effect disengagement of the discs of both sets upon the release of disc-packing pressure.

Another object of the invention is to provide improved devices of the type described having engageable friction discs respectively connected to relatively rotatable members, the device being characterized by the discs, connected to one of said members, being resilient and formed and arranged to cooperatively control one of the engaging and disengaging operations of the device.

Another object of the invention is to provide improved devices of the type described having engageable friction discs respectively connected to relatively rotatable members, the discs, connected to one of the members, being flexible and frusto-conical elements adapted to flex and thereby transmit force from one to the other under disc-packing pressure to engage all of the discs, and upon release of such pressure, the unflexing action of the elements acting to separate and thereby disengage the discs of the device.

Another object of the invention is to provide improved friction-engaging devices of the multiple friction disc type which have the features of economy in manufacture, simplicity, and compactness.

The invention is more particularly described with reference to the accompanying drawings in which certain constructions are illustrated by way of example and in which:

Figure 1 is a fragmentary axial sectional view through a multiple friction disc-engaging device embodying the invention and showing the discs disengaged;

Fig. 2 is a sectional view taken on line 2—2 of Figure 1;

Fig. 3 is an enlarged view of certain of the discs, shown in Figs. 1 and 2, and showing the discs engaged;

Fig. 4 is a fragmentary axial sectional view through a friction disc-engaging device with modified friction elements;

Fig. 5 is a fragmentary axial sectional view through a friction-engaging device with other modified friction elements; and Fig. 6 is a fragmentary axial sectional view through a friction-engaging device illustrating still another modification of the invention.

Similar reference numerals designate similar parts of the friction disc-engaging devices in the various views of the drawings.

In the drawing accompanying this description, the multiple friction disc-engaging device and modifications thereof, shown in the various figures, are contemplated for use either as a clutch or a brake. In the preferred embodiment shown in Figs. 1–3, the device comprises two relatively rotatable members 10 and 11, the member 10 being indicated as a sleeve shaft rotatably mounted upon one end of member 11 in the form of a solid shaft. The end of the sleeve shaft 10 is formed to provide a cylindrical drum 12 and the sleeve shaft 11 is provided with a cylindrical drum 13 in spaced telescoping relation to the drum 12. Between the drums 12 and 13 are a plurality of interleaved friction elements or members comprising two sets of annular axially aligned and engageable discs 14 and 15 interlocked respectively with the drums as the drum 12 is provided with circumferentially spaced axially extending grooves 16, in an outer cylindrical surface 17 thereof, receiving projections or tangs 18 extending radially inwardly from the annular discs 14 and the drum 13 having spaced axially extending grooves 19, in an inner cylindrical surface 20 thereof, receiving projections or tangs 21 extending radially outwardly of the annular discs 15. It will be apparent that the described structure and relationship of the discs and drums permits movement of the discs 14 and 15 axially of the device for engagement with each other but prevents rotation of the discs relative to the particular drum to which the discs are connected. To maintain the discs within the drum 13 and thereby interlocked with their respective supporting drums, a retaining ring 22 is positioned within the drum 13 and is provided with projections received within the grooves 19 of the drum, the ring 22 being prevented from movement axially outwardly of the drum by a split-locking ring 23 received within an annular groove 24 in the drum 13.

The discs 14 and 15 are engaged with each other to connect the shafts 10 and 11 by an annular piston 25 fitting within the drum 13 and axially slidably supported on radially spaced cylindrical surfaces 26 and 27 of the drum 13 and shaft 11 for movement toward a disc 15 disposed at one end of the row of the discs to urge the discs 14 and 15 into engagement. The piston is actuatable by fluid under pressure introduced into a chamber 28 through a passage 29, in the shaft 11, connected to a suitable source of fluid pressure controlled by a valve, or other device (not shown) for controlling the flow of the fluid under pressure to, and releasing the fluid in, the chamber 29.

Referring to Figs. 1, 2 and 3, the discs 14 are of conventional type, each disc 14 comprising annular flat plate 30 having opposed surfaces provided with parallel sintered powdered metal friction facings 31 and 32.

In the embodiment of the invention shown in Figs. 1, 2 and 3, the discs 15 are illustrated with respect to their construction and arrangement in relation to the other described parts of the device. More particularly, and referring to Fig. 1 illustrating the discs 15 and 14 in disengaged relation, each of the friction members or discs 15 comprise an annular plate of thin sheet metal having resiliency, such as steel, to form springs, the springs having a generally conical shape or, more particularly, a frusto-conical formation and each spring being provided at its outer peripheral edge or margin with the projections or tangs 21. The discs 15 are arranged in pairs or sets with the discs of each pair being disposed with their adjacent inner friction surfaces 33, as well as their remote outer surfaces 34, disposed at an angle to each other or, more particularly, converging radially outwardly toward the drum 13, the surfaces 33 of each pair of springs receiving a disc 14 therebetween and being spaced from the parallel friction surfaces of the disc 14, in the disengaged condition of the device, as shown in Fig. 1. At the radially inner peripheral edges of the surfaces 34, the discs 15 contact each other as at 35, and the ends of the tangs 21 also contact each other as at 36. Upon actuation of the piston 25, the pressure exerted by the piston will be initially applied to the adjacent engaged radially inner margin of the contiguous disc 15, and the pressure is uniformly applied through the tangs 21 and the contacting inner edges of the discs 15 to flex each of the discs 15, the flexing action of the discs 15 being transmitted by the discs to each other during initial and full engagement of the friction surfaces of the discs 15 and the discs 14. As seen in Fig. 1, the tangs 21 of each disc 15 are angularly offset from the plane of the disc, portions 37 of the tangs diverging radially at a substantially greater angle than the angle of the body of the disc and then at a lesser angle at the tips 38.

As shown in Fig. 1, when the discs 14 and 15 are disengaged, the radially outermost edges of the tangs have line contact with each other and the radially inner peripheral edges of the discs also have line contact with each other. Accordingly, as pressure is applied to the disc 15, adjacent the piston 25, by the piston, the body of this disc will be flexed and thereby moved to exert pressure yieldingly through the tangs 21 thereof to the tangs 21 of the next disc 15, which disc in turn through its engagement of its radially inner edge with the like edge of the succeeding disc 15, etc., will urge the discs 15 into engagement with the discs 14. It will be understood the reaction of the flexed discs to compression being assumed by the ring 22 engaged with the disc 15 to the left of Fig. 1.

More particularly, engaging edges of the tangs 21 initially provide, as do the engaging radially edges of the discs 15, fulcrum points about which the discs 15 rotate during flexing thereof in the initial engaging action of the device. As the discs 15 move toward engagement with the disc 14 under increasing pressure, the surfaces 39, 39 of the tangs engage each other with rolling contact until the radially outer edges of each disc 14 engage the sides of the adjacent discs 15. Thereafter, further flexing of the discs 15, will cause the engaged surfaces 39, 39 of the tabs to separate, as shown in Fig. 3, as the radially outer edges of the discs 14 provide fulcrum points about which the discs 15 rotate until each point of the discs 15 are fully engaged with the discs 14 as shown in Fig. 3, adjacent discs 15 engaging each other. Upon release of the pressure by the piston 25, disengagement of the discs 14 and 15 occurs as the flexed discs 15 act to resume their normal shape due to the resilient characteristics of the metal discs 15. Such action causes the discs 15 to fulcrum with respect to each other and the discs 14 reversely of an engaging action as described, the tips of the tangs 38 engaging and the radially inner edges of the discs 15 affording reaction points to insure the discs 15 being completely disengaged from discs 14. The discs 15 are formed to be preferably, but not necessarily, designed to operate as Belleville washer type springs.

Fig. 4 illustrates a modification of the friction-engaging device shown in Figs. 1-3, inclusive. More particularly, the coned spring discs 40 are arranged in pairs and between each pair is disposed a disc 41, the discs 40 of each pair are formed to diverge radially outwardly of the drum 12 and toward the drum 13. The tangs 42 of the discs 40 are received within the grooves 16 of the drum 12, and the tangs 43 of the discs 41 are received within the groove 19 of the drum 13. It will be apparent from an inspection of Fig. 4 that the tangs 42 of the discs 40 are formed comparable to the tangs 21 of the discs 15 of Figs. 1, 2 and 3 and, accordingly, have similar characteristics for comparable operation during the engaging and disengaging actions thereof, the discs 40 engaging the discs 41 under packing pressure which may be supplied by the piston 25 of Fig. 1 to couple the drums 13 and 12 for conjoint rotation. The discs 40 are formed preferably of resilient steel and may be of the Belleville washer type to flex under the pressure of the piston 25 to engage the discs 14 and to store energy to return to their original forms as shown in Fig. 4 to thus positively insure disengagement of the discs 40 and 41 upon the release of packing pressure by the piston 25.

Fig. 5 illustrates another modification of the flexible discs of the friction-engaging device of Figs. 1-3 and more particularly, a frusto-conical flexible friction disc 44 of the Belleville washer type is paired with a friction disc 15, shown in Figs. 1, 2 and 3, the discs 44 and discs 15 being flexed to engage the friction discs 14 disposed therebetween. As shown in Fig. 5 each friction disc 44 is provided with tangs 45 received within the grooves 19 in the drum 13 and it will be noted that the tangs 45 lie in the plane of the body 46 of the disc 44 whereas the tang 21 is offset from the body 47 of the disc 15. The radially outer edges of the tangs 45 of the discs 44 have line contact at 48 with the radially outer edges of the tang 21 on the discs 15 and the radially inner edges of the discs 44 and 15 also have line contact, as shown in Fig. 5. During flexing of the discs 15 and 44 by the piston 25 to engage the discs 14, the discs 15 and 14 will fulcrum about the point 48 of contact initially and, during increasing pressure, will have a rocking or rolling contact of the surfaces 39 and 49 of the tangs 21 and 45 of the discs 15 and 44, respectively. Upon the friction faces of the discs 15 and 44 engaging the radially outer edges of the friction faces of the discs 14, the tangs will separate as the discs 15 and 44 will fulcrum at 50 about the radially outer edges of the discs 14 prior to full engagement of the friction surfaces of the discs 15 and 44 with the friction faces of the discs 14. Upon the packing pressure being released by the piston 25 the flexed discs 15 and 44 will act, through the stored energy thereof, reversely to their operation described and will disengage the friction discs 14.

Fig. 6 illustrates another modification of the clutch engaging device shown in Figs. 1, 4 and 5 and, in this modification, sets of annular, flexible and Belleville washer type friction discs 51 and 52 are effective to engage friction discs 14. These sets of discs 51 and 52 are of frusto-conical form and have tangs 53 and 54 received within grooves 19 of the drum 13, the tangs associated with the particular disc 51 on disc 52 lying in the plane of the body of the disc, as clearly as shown in Fig. 6.

Between the disc 51 and 52 of each set is disposed a ring 55 which may be formed of resilient wire and is preferably square in cross section, as shown in Fig. 6. These rings 55 are positioned in the radial planes of the discs 14 and slidably and guidingly engage the inner cylindrical surface of the drum 19. The rings function to separate the associated discs 51 and 52 from the discs 14 disposed between the discs 51 and 52 in the disengaged condition of the friction-engaging device, as shown in Fig. 6. Upon the application of clutch packing pressure by the piston 25, the tangs 53 of the disc 51, at the right of Fig. 6, will flex and fulcrum about their points of contact 56 with the ring 55 and, in so doing, will urge the ring 52, through its tangs 54, toward the left of said figure so that the disc 52 will fulcrum about its line contact 56 with the ring and thereby urge the next succeeding disc 51 to the left of said figure through the engagement at 57 of the radially inner edges of the discs 52 and 51. This action is continued with respect to the succeeding sets of discs 51 and 52. Upon greater pressure being applied to the discs 51 and 52, the sides 58 of the tangs 53 and 54 of the discs 51 and 52 will engage the sides of the rings and at this time, the friction surfaces of the discs 51 and 52 will be fully engaged with the friction faces of the discs 14 and adjacent discs 51 and 52 will be engaged with each other, the resilient rings 55 being urged to the left of Fig. 6. It may be noted that the thickness of each ring is equal to or slightly less than the thickness of the friction disc 14 around which it is positioned so that each set of the flexed discs 51 and 52 have full friction face engagement with the discs 14 positioned therebetween. Upon release of packing pressure, the flexed discs 51 and 52 will resume their normal conical shape and, in so doing, will act to disengage the discs 14 whereupon the drums 12 and 13 will be released for relative rotation. It will be apparent that, during engaging and disengaging action of the device shown in Fig. 6, the wire rings can freely move axially of the device along the inner cylindrical surface 59 of the drum 13.

While I have illustrated and described certain preferred embodiments of friction-engaging devices, it will be readily understood that the resilient friction discs may take other forms than those shown in disclosing this invention and it is contemplated that the appended claims cover all such modifications coming within the spirit and scope of the invention.

I claim:

1. In a friction-engaging device, a pair of friction members comprising annular springs generally conical in shape and converging in a radial direction; a friction element between said springs; means supporting said springs and element for movement axially of each other, said springs having their convergent ends radially spaced from said element and engaged to position said springs a sufficient distance from each other to permit axial movement of said element between said springs in the disengaged condition of said device; and means for flexing said springs to engage said springs with said element.

2. In a friction-engaging device, a pair of friction members comprising axially aligned annular springs generally conical in shape and having adjacent surfaces disposed at an angle to each other and to the common axis of the springs, said springs being disposed to converge in a radial direction; a friction element having parallel surfaces normal to the common axis of said springs; means supporting said springs and element for axial movement relative to each other; and means for flexing said springs to engage said surfaces thereof with said surfaces of said element, said springs having their convergent edges engaged and at least one of said convergent edges being deformed to position said springs with at least one of the friction surfaces thereof disengaged from said element in the disengaged condition of said device.

3. In a friction-engaging device, a pair of friction members comprising annular springs having adjacent friction surfaces disposed at an angle to each other; a friction element between said springs and having friction faces on opposite sides thereof; means for flexing one of said springs to engage one of the friction faces of said element; and means radially spaced from said element and associated with said springs for transmitting pressure, induced in said one spring by flexing thereof, directly from said one spring to the other of said springs to engage said latter spring with the other friction face of said element.

4. In a friction-engaging device, a pair of friction members comprising axially aligned annular springs generally conical in shape and having adjacent surfaces converging in a radial direction and at an angle to the common axis of said springs; a friction element between said springs and having friction faces on opposite sides thereof; fulcrum means radially spaced from said element and associated with the converging ends of said springs; means for flexing one of said springs to engage one of said friction faces and to transmit forces through said fulcrum means to the other of said springs to urge the latter spring into engagement with the other of said friction faces of said element.

5. In a friction-engaging device, a plurality of friction discs; a row of axially aligned sets of annular springs each spring being of generally conical shape and each set of springs having friction faces diverging in a radial direction and receiving a friction disc therebetween and in spaced relation thereto; an axially fixed element engaging the spring at one end of the row; means in radially spaced relation to said friction discs and directly connecting the springs of said sets and operative to receive and transmit pressure applied to the spring at the other end of the row directly and successively to the other springs in the rows; and an axially movable member for applying pressure to the spring at said other end of the row to flex the spring to engage the adjacent disc and also to transmit pressure from the spring through said means to the other springs in the row to flex said other springs to engage the friction faces of the discs.

6. In a friction-engaging device; a friction element; a pair of friction members comprising annular springs generally conical in shape and having adjacent friction surfaces diverging in a radial direction and receiving said element therebetween, each of said springs having circumferentially spaced tangs projecting radially therefrom, the tangs on at least one of said springs being offset laterally of the spring and engaging the tangs on the other of said springs to position said springs a sufficient distance apart to space at least one of said springs from the friction element in the disengaging condition of said device; and means for flexing said springs to engage said friction faces of said springs with said friction element.

7. In a friction-engaging device, a friction disc having generally parallel friction faces; a pair of friction members comprising first and second annular springs of generally conical shape and having friction surfaces receiving said disc therebetween and tangs projecting radially from each spring with the tangs of one of said springs contacting the tangs of the other spring radially of said disc; and means for applying pressure to said first spring to flex said first spring to engage portions of the friction faces of the friction disc and said first spring and to transmit an initial flexing action of said first spring through said tangs of said springs to said second spring to engage portions of the friction faces of the latter spring and the disc, further flexing of said first spring separating said engaged tabs and effecting movement of said springs about the portions of said disc engaged therewith to fully engage the friction faces of said springs and said disc.

8. In a friction-engaging device, a friction disc having substantially parallel friction faces; a plurality of friction members comprising annular springs of generally conical shape and having adjacent friction faces receiving said friction disc therebetween, and tangs projecting radially from each spring, the tangs of at least one of said springs being radially offset therefrom and engaging the tangs on the other of said springs; and means for flexing one of said springs toward said disc and to transmit pressure, induced in said flexed spring to said tangs to flex the other spring toward the disc and for engaging portions of said friction faces of said disc and said springs and thereby relieving the pressure on said tangs to separate the same and to transfer the pressure to the engaged portions of the disc and springs to further flex the springs to position the friction faces thereof in parallelism to the friction faces of said disc and in engagement with the same.

9. In a friction-engaging device; a friction element; a pair of friction members comprising annular springs generally conical in shape and having adjacent friction surfaces diverging in a radial direction and receiving said element therebetween, each of said springs having circumferentially spaced tangs projecting radially therefrom, the tangs on each spring being offset laterally of the spring and engaging the tangs on the other of said springs in radially spaced relation to said element to position at least one of said springs in spaced relation to said friction element during disengagement of said device; and means for flexing said springs to engage said friction faces of said springs with said friction element.

10. In a friction-engaging device, a friction disc having substantially parallel friction faces; a plurality of friction members comprising annular springs of generally conical shape and having adjacent friction faces receiving said friction disc therebetween, and tangs projecting radially from each spring and laterally at an angle of said spring and engaging the tangs on the other of said springs in radially spaced relation to said disc to position said springs with at least one of said springs disengaged from said disc; and means for flexing one of said springs toward said disc and to transmit pressure, induced in said flexed spring to said tangs to flex the other spring toward the disc and for engaging portions of said friction faces of said disc and said springs and thereby relieving the pressure on said tangs to separate the same and to transfer the pressure to the engaged portions of the disc and springs to further flex the springs to position the friction faces thereof in parallelism to the friction faces of said disc and in engagement with the same.

11. In a friction-engaging device, a friction disc having generally parallel friction faces; a pair of friction members comprising first and second annular springs of generally conical shape and having friction surfaces receiving said disc therebetween and tangs projecting from the radially outer margin of each spring with the tangs of one spring being laterally offset from said one spring and contacting the tangs of the other spring in radially spaced relation to said disc to position at least one of the friction surfaces of said springs spaced from said disc during disengagement of said device; and means for applying pressure to said first spring to flex said first spring to engage portions of the friction faces of the friction disc and said first spring and to transmit an initial flexing action of said first spring through said tangs of said springs to said second spring to engage portions of the friction faces of the latter spring and the disc, further flexing of said first spring separating said engaged tabs and effecting movement of said springs about the portions of said disc engaged therewith to fully engage the friction faces of said springs and said disc.

12. In a friction-engaging device, a friction disc having substantially parallel friction faces; a plurality of friction members comprising annular springs of generally conical shape and having adjacent friction faces receiving said friction disc therebetween, and tangs projecting radially from the radially outer margin of each spring, the tangs of each spring being radially offset therefrom and engaging the tangs on the other of said springs to position at least one of the friction faces of said springs in spaced relation to said disc; and means for flexing one of said springs toward said disc and to transmit pressure, induced in said flexed spring to said tangs to flex the other spring toward the disc and for engaging portions of said friction faces of said disc and said springs and thereby relieving the pressure on said tangs to separate the same and to transfer the pressure to the engaged portions of the disc and springs to further flex the springs to position the friction faces thereof in parallelism to the friction faces of said disc and in engagement with the same.

13. In a friction-engaging device, a friction element having friction faces; a pair of friction members comprising annular springs having their axes in alignment, said springs being generally conical in shape and converging in a radially inward direction, each spring having angularly disposed friction surfaces receiving said element therebetween and engageable with said friction faces of said element upon flexing of said springs, each spring having circumferentially spaced tangs projecting from the radially inner margin thereof and offset from the spring and engaging the tangs on the other of said springs to position at least one of the friction faces of said springs in spaced relation to said element in the disengaged condition of said device; and means for flexing said springs to engage said friction faces of said springs with said friction element.

14. In a friction-engaging device, a friction disc having generally parallel friction faces; a pair of friction members comprising a first and second annular springs of generally conical shape and having friction surfaces receiving said disc therebetween and tangs projecting radially from each spring with the tangs of one of said springs contacting the tangs of the other spring radially of said disc to position at least one of said friction faces of said spring in spaced relation to said disc in a disengaged condition of said device, the tangs on said one spring being offset laterally of the spring and the tangs on said other spring having the conical shape of the body of the latter spring; and means for applying pressure to said first spring to flex said first spring to engage portions of the friction faces of the friction disc and said first spring and to transmit an initial flexing action of said first spring through said tangs of said springs to said second spring to engage portions of the friction faces of the latter spring and the disc, further flexing of said first spring separating said engaged tabs and effecting movement of said springs about the portions of said disc engaged therewith to fully engage the friction faces of said springs and said disc.

15. In a friction-engaging device, a pair of friction members comprising axially aligned annular springs generally conical in shape and having adjacent surfaces converging in a radial direction and at an angle to the common axis of said springs; a friction element between said springs and having friction faces in opposite sides thereof; an annular ring radially spaced from said element and disposed between and engaging the converging ends of said springs; and means for flexing one of said springs to engage one of said friction faces and to transmit forces through said ring to the other of said springs to urge the latter spring into engagement with the other of said friction faces of said element.

16. In a friction-engaging device, a pair of friction members comprising annular springs generally conical in shape and converging in a radial direction; a friction disc between said springs; a ring disposed between and engaging portions of said rings radially spaced from said disc; and means for flexing said springs to engage said surfaces thereof with said disc, said ring and disc having generally the same thickness to insure substantially simultaneous engagement of said springs with said disc.

17. In a friction-engaging device; a friction element; a pair of friction members comprising annular springs generally conical in shape and having adjacent friction surfaces diverging in a radial direction and receiving said element therebetween, each of said springs having circumferentially spaced tangs projecting radially therefrom; a ring between said springs and engaging said tangs; and means for flexing said springs to engage said friction faces of said springs with said friction element.

References Cited in the file of this patent

UNITED STATES PATENTS

| 2,166,130 | Coe | July 18, 1939 |
| 2,174,240 | Glenney | Sept. 26, 1939 |
| 2,540,965 | Schellinger | Feb. 6, 1951 |

FOREIGN PATENTS

| 646,120 | Germany | June 8, 1937 |